Dec. 21, 1965  L. M. CONKLIN ETAL  3,225,131
CABLE WRAP
Filed Jan. 18, 1963

INVENTORS
LLEWELLYN M. CONKLIN &
ALFRED WINSOR BROWN
BY
ATTORNEYS

`United States Patent Office`

3,225,131
Patented Dec. 21, 1965

3,225,131
CABLE WRAP
Llewellyn M. Conklin, Riverside, and Alfred Winsor Brown, Woonsocket, R. I., assignors to Owens-Corning Fiberglas Corporation, a corporation of Delaware
Filed Jan. 18, 1963, Ser. No. 252,458
8 Claims. (Cl. 174—25)

This invention relates to electrical insulation materials, and more particularly to oil-impregnated paper wrappings for high voltage electrical transmission lines and methods of production.

*The problem*

Oil filled paper tapes have been commonly employed heretofore for wrapping high voltage transmission lines, such as underground cables. In these structures the individual conductors are encased in an insulating jacket and several such cables, of varying polarity, are enclosed within an outer sheath, as of lead, to make a larger transmission cable, typified by the underground sub-way installations and the like.

As is well known, increasing population brings increasing consumption and greater demand for electrical power. This imposes an additional load on presently existing lines, and in new installations, provision must be made for expanded future requirements. More efficient transmission and increased economy of operation necessitate the use of higher voltage throughputs in long distance transmission cables. Thus, to be economically competitive, the user, such as utility company or the like, desires that a cable have highest efficiency commensurate with cost. Thus the ultimate would be a cable containing minimum conductive metal such as expensive copper, but large transmission capacity. Thus, a highly efficient cable wrap or insulator is a present necessity.

However, as is well known, the prior oil-filled paper tape wraps have not been suited to the increasing economic demands enumerated. Due to the high dielectric constants of such heretofore available materials and the degradation of their qualities in use, cable manufacturers have been unable to produce cables capable of withstanding sustained higher voltages for transmission purposes.

Accordingly, a valuable step forward in the art would be provided by an oil-filled paper cable wrap having unexpectedly improved dielectric properties as compared to the components, to solve the pressing present problem.

*Objects*

It is, accordingly, an important object of the present invention to provide an improved oil filled paper cable wrap.

A further important object is to provide an improved oil filled paper cable wrap containing glass flake, which composite wrap displays an unexpectedly low dielectric constant and dissipation factor.

A still further object is to provide an oil filled paper cable wrap having an unexpectedly low dielectric constant, by the combination of glass flake having a relatively high dielectric constant into the paper in a novel manner.

A still further object is to provide a method of producing oil-filled paper cable wrap.

A further object is to provide a method of producing a novel electrical insulating paper.

Another object is to provide a method of producing improved electrical transmission cables.

Other objects of this invention will appear in the following description and appended claims, reference being had to the accompanying drawings forming a part of this specification wherein like reference characters designate corresponding parts in the several views.

Before explaining the present invention in detail it is to be understood that the invention is not limited in its application to the details of construction and arrangement of parts illustrated in the accompanying drawings, since the invention is capable of other embodiments and of being practiced or carried out in various ways. Also, it is to be understood that the phaseology or terminology employed herein is for the purpose of description and not of limitation.

*Perspective view*

Briefly, the present invention relates to a novel combination of an oil-impregnated glass-flake containing paper cable wrap and method of production wherein a careful lateral flake spacing is provided through controlled application of the flake to the paper stock, utilizing flakes of selected size.

Also, the present invention relates to a method of producing oil-filled flake-paper combination electrical cable wrap by careful introduction of flake of a certain size and weight into the paper-making slurry just before sheeting out.

It will become evident as the present description progresses that an unexpected result is provided in accordance with the present invention by virtue of the fact that the composite is characterized by a dielectric constant of 2.25 as well as a lower dissipation factor, whereas the constants of the constituent materials include glass flake having a dielectric constant of 6; paper having a dielectric constant of 3; and oil having a dielectric constant of 2.

*The product of invention*

Figure 1:
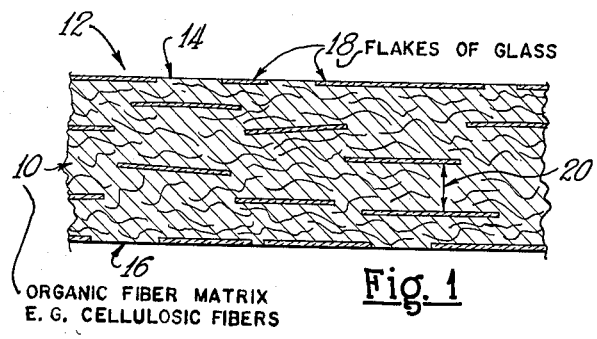
FIGURE 1 is approximately a 200× enlarged cross-sectional representation of a glass flake-containing paper utilized in the present invention.
Figure 2:
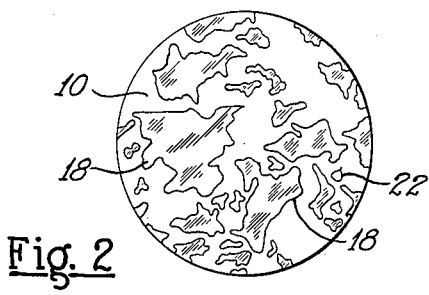
FIGURE 2 is an approximate 2× enlarged plan view showing the flake particles in the paper of FIG. 1.

By reference to FIGURES 1 and 2 of the drawings, it will be noted that paper made in accordance with the present invention comprises a fibrous matrix designated by the reference numeral 10. The matrix material 10 is formed into a sheet 12 having upper and lower surfaces 14 and 16 respectively. Dispersed throughout the thickness of the sheet 12 are a plurality of glass flakes 18. It will be noted that all of the flakes 18 are in uniform parallel alignment and distributed throughout the thickness of the sheet 12 with thin interlayers of fibers therebetween, designated by the reference numeral 20.

As will be noted by reference to FIGURE 1, a cross section magnification of approximately 200× is illustrated. This would represent an actual sheet of paper approximately five-thousandths of an inch thick. It will therefore be understood that a flake of glass 18 and an intermediate layer of fibers 20 can, together, occupy a total thickness measured in terms of microns or angstroms. This means that the interlayer between the flakes is extremely thin, usually about the thickness of a molecule of oil.

When it is understood that the sheet 12 is ultimately impregnated with oil of a nature adapted to electrical insulating applications, it will be understood that the layers of oil between the flakes will be extremely thin. The manner in which impregnation is effected by the method of invention will be set forth hereinafter, and the types of oils utilized will also be described. At this time, however, it should be pointed out that the films or layers of oil beween the flakes, by virtue of application of the flakes to the sheet in accordance with the present invention, are believed to be so thin as to orient the molecules of the oil with their length in the plane of the sheet, and are held against becoming oriented transverse to the sheet when placed under the influence of high electrical voltages. As will be shown hereinafter, while it is not considered to be limiting, it is believed that this orientation of the oil molecules may have a substanial effect on the unexpected electrical characteristics of the products of the present invention.

FIGURE 2

By reference now to FIGURE 2, which is an approximate 2× magnification of a portion of a surface of a sheet of paper made in accordance with the present invention, it will be noted that the glass flakes 18 are of reasonable size, preferably 1/16 to 3/8 inch square. It will be noted however that the flakes are extremely thin, and are retained in the said substantial size despite their processing into the paper pulp, with ultimate formation of paper, by being placed into the paper slurry just before sheeting out. This avoids undue breakage, although as reference to FIGURE 2 will show, some small particles are broken away from the flakes which are slightly less than the desired size. One such small particle is indicated at 22 in FIGURE 2.

Also, by reference to FIGURE 2, it will be noted that the fibrous matrix surrounding the flakes 18 is designated by the reference numeral 10.

The characteristics of the paper

Although not capable of being accurately conveyed by the foregoing hand drawings, the flakes used in one preferred embodiment of the present invention are of a nominal thickness of about 2.5 microns. It will thus be understood that a plurality of flakes 18 can be readily dispersed throughout the thickness of a sheet of paper of a total thickness of approximately five-thousandths inch, with room between the flakes for very thin intervening layers of separating fibrous material into which oil can be placed by vacuum impregnation techniques.

It is an extremely surprising aspect of the present invention than an oil-filled cable wrap made using kraft paper and careful flake spacing has a dielectric constant of 2.25 as well as a lower dissipation factor. This is amazing in view of the fact that the dielectric constants of the constituents of the tape are as follows:

Glass flake ------------------------------------ 6.0
Paper ------------------------------------------ 3.0
Oil -------------------------------------------- 2.0

The method of invention

Figure 3:
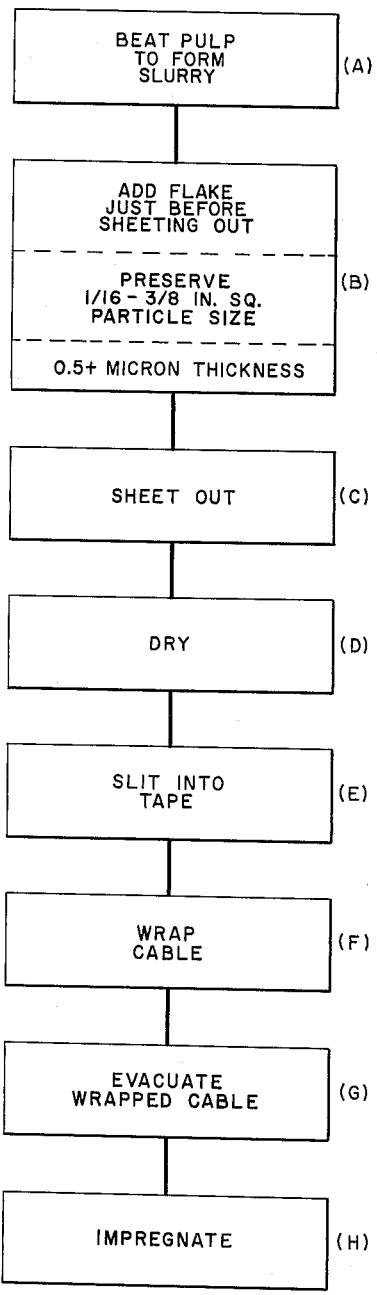
FIGURE 3 is a schematic flow diagram of the process of the present invention.

By reference to FIGURE 3, of the drawings, it will be observed that a schematic flow diagram is provided illustrating the various steps involved leading to the improved electrical cable of invention. Actually, the process illustrated in FIGURE 3, is of two-fold aspect as follows:

(1) The method of producing paper; and
(2) The method of utilizing such paper to wrap a cable, followed by evacuation and impregnation to provide a method of forming an improved electrical cable.

By reference to FIGURE 3, it will be noted that the various method steps within the total scope of invention include the following:

(A) Beating a suitable pulp material to form a paper-making slurry;
(B) Adding flake glass just before sheeting out so as to preserve a preferred one-sixteenth to three-eighths inch square particle size. By adding the flake at this point, the flakes are not unduly broken by the pulp beaters;
(C) Sheet out the paper as by a cylinder or Fourdrinier machine or the like;
(D) Dry;
(E) Slit into tape;
(F) Wrap cable;
(G) Evacuate the wrapped cable; and
(H) Impregnate with an electrical oil.

In the light of the foregoing brief perspective view of the method(s) involved in the present invention, a full and complete description of each stage and the coordination of the stages in the process will now be provided.

Step A—Beat pulp to form slurry

Thus, by reference to FIGURE 3, note Step A, which includes the commercial production of a suitable kraft paper slurry stock. This is effected in pulp beaters, using either wood fibers or cotton fibers or equivalent organic fibers, and designated broadly as cellulosic, as will be apparent to those skilled in the paper-making art. The proportions of water and fibers and the amount of beating necessary to render the fibers of a commensurate paper-making length and dispersion will be followed. This concludes Step A.

Step B—Flake addition

This step comprises addition of glass flakes of a particle size preferably in the range between about one-sixteenth and about three-eighths inch square in area, and of a thickness of about 0.5 to about 10 microns. It will be noted that Step B involves addition of the flake to the pulp slurry just before the sheeting out step. By so operating, the flakes are in contact with the pulp beaters for a very short time and therefore are not unduly broken by the beaters. Thus, their one-sixteenth to three-eighths inch square area preferred particle size is retained.

Step C—Sheet out

The paper is now sheeted out as upon a cylinder or Fourdrinier machine, designating or pertaining to a machine for making paper in an endless web, utilizing a foraminous carrier; or equivalent sheeting process.

Step D—Dry

Thereafter, the sheet will proceed to a drying oven where the moisture content is reduced to a proper level to provide a durable, coherent paper as illustrated in the cross-sectional view of FIGURE 1.

Step E—Split into tape

At this stage in the process, the so-formed flake-fiber paper sheet is slit by spaced knives into a tape of a width commensurate for use in an electrical cable wrapping operation. The exact width is not considered to be limiting upon the present invention and therefore the broad statement will be tendered that tape widths of a length adapted to use with various cable-wrapping machines will be provided in accordance with the invention.

Step F—Wrap cable

The tape produced by Step E is now applied by known cable-wrapping machines and a layer of wrap commensurate with the application of the cable to actual transmission purposes is provided.

Step G—Evacuate the wrapped cable

Upon completion of the wrapping process, the cable is subjected to evacuation to relieve or permit all included gas, and ambient atmosphere, to be displaced from the pores of the paper, including the interstitial spaces hereinabove referred to that exist between the spaced flakes forming a component part of the paper.

When the pressure has been reduced to a suitably low level for proper impregnation, Step H is thereafter effected.

Step H—Impregnation

Oil of an appropriate viscosity and at an appropriate temperature, commensurate with the state of the art and the ultimate utility application to which the cable is to be subjected is thereafter released into the evacuated, wrapped cable to fill the pores and the interstitial spaces between the flakes and fibers making up the sheet 12 of FIGURE 1.

It is to be understood that the impregnation step will include removal of excess oil by suitable techniques, such as wiping, draining or the like to provide a finished product ready for shipment to a user.

In accordance with the foregoing, it will be understood that the process of the present invention has proven commercial utility and is capable of producing a novel, functional product.

*Extended scope of invention*

The foregoing disclosure has alluded to glass flake in general. In a preferred embodiment of the invention, E-glass is preferred. E-glass is the nomenclature adopted by manufacturers of fibrous-glass yarns for a low-alkali, lime-alumina borosilicate glass composition containing the following ingredients: $SiO_2$ 54.5%, $Al_2O_3$ 14.5%, $CaO$ 22.0%, $B_2O_3$ 8.5%, and $Na_2O$ 0.5%; pp. 375 and 411, Glass Engineering Handbook by E. B. Shand, 2d. Ed., McGraw Hill Book Co., Inc., N.Y., 1958. However, the broad scope of invention will include other glasses of this general type having a dielectric constant ranging as high as 8, although the lower dielectric constant glasses such as E-glass, typified by a dielectric constant of 6 will generally be preferred. Glasses having dielectric constants as low as 4, of course, are highly desirable and can even further enhance the ultimate utility of the product of invention.

Within the extended scope of invention, the flakes, rather than being substantially flat, may be provided with an embossed pattern, which permits vacuum treatment for more ready removal of entrapped gases both from the pores of the paper and also from the interstitial spaces between the flakes.

Also, within the extended scope of invention, the flake materials may be broadened to include quartz, mineral flake and flakes or fragments of films of synthetic resins. Thus, broadly, heat-softenable flakes including siliceous materials are applicable.

Flake thickness will generally fall in the range from about 0.5–10 microns, and preferably in the range from about 1.5 to 3 microns, as set forth in an exemplary embodiment above.

The amount of glass flake by weight used in accordance with the present invention, although serving as a means to an end, is not to be considered as limiting upon the invention. Rather, the important aspect of the invention now appears to be that a certain spacing between the flakes of glass is important, and in a preferred exemplary embodiment, the addition by weight of about 75% kraft and 25% flake E-glass of about 2 micron thickness about one-sixteenth to three-eighths inch square area provided the unexpected result alluded to above.

Therefore, it is felt that the interstitial spacing of the flakes is highly important to the retention of substantially molecular thickness films of oil in the paper, with the length of the molecules oriented in the plane of the paper and prevented from being oriented transverse to the plane of the paper through electrical influence, and is believed to be an important and highly desirable aspect of the invention. Therefore, while the percentage of glass added has been utilized as a means to achieve this end, it is not desired to limit the invention to an exact 25% addition of glass where departures from this level would nonetheless, pending use of different glasses, provide the same unexpectedly low dielectric constant.

As regards the limits of glass use, from about 15% by weight to about 40% by weight can be considered within the scope of invention.

Paper stock used in accordance with the present invention is a good grade of kraft, as made from wood fibers or pulp. It is generally preferred that extraneous additives, such as clay fillers and the like, be kept to a minimum so that the paper stock is relatively pure. Of course, if desired, wetting agents to provide a couple between the fibers and the electrical oil impregnant may be utilized to a selected degree if desired. These, in accordance with the present invention, would be designated oil-philic agents.

The broad scope of invention will include cellulosic materials such as wood fibers, and also cotton fibers.

The broad scope of invention might possibly include in the paper the use of inorganic siliceous fibers such as glass fibers, mineral fibers, such as quartz and the aluminosilicates, and perhaps resinous fibers such as nylon and the like in addition to or even perhaps in place of the natural, cellulosic fibers described hereinbefore. It will of course be understood that the natural cellulosic materials provide a substantial advance in the art without disrupting existing manufacturing techniques or without incurring appreciable changes in tape, cable wrapping machinery.

Thus, the embodiment described above under the heading "Method of Invention" will generally be preferred. However, it will be evident to one skilled in the art that substantial further effects and improvements in efficiencies can be provided in accordance with the present invention when the various ramifications thereof are given cognizance on an industrial production basis, that is, using different papers, fibers, flake, appropriate processing techniques, and the like.

Oils usable within the scope of invention will include non-polar materials such as aliphatic and aromatic hydrocarbons; also, it may be considered within the scope of the invention in some instances to use polar compounds, typified by trichlorobenzene.

As used in this specification, oil is to be construed as a dielectric material. Therefore, the extended scope of invention will include other dielectric materials. Those which are known to be operable include the Buton resins (trademark for butadiene-styrene copolymers which are thermosetting plastics; cure temperatures 70–1100° F.), polyethylene and admixtures thereof.

*Discussion and possible theory*

While it is not desired to limit the scope of the present invention, it is possible that the "Garton Effect" (after C. G. Garton who first published the mathematical theory, J. Inst. of Elec. Eng., 88, II, 103–120 (1941)), has been utilized in accordance with the present invention. Roughly put, this theory states that the power factor or dissipation factor of an impervious film-oil combination can be much less than either component, if the oil film between the lamina or in the interstitial spaces is of certain dimensions, selected according to voltage stress, viscosity, etc. Some sources indicate that research and development people have generally agreed that the end of the line has about been reached with paper and oil for cable wrapping. Accordingly, it is a surprising and unexpected result of the present invention that the parameters of paper-oil wrappings have been unexpectedly extended by utilization of glass flake, perhaps to utilize the Garton effect.

Thus, the barrier appears to be broken in accordance with the present invention. It is not known that anyone heretofore has explored the possibilities and recognized the phenomenon of glass flake as unexpectedly improving the dielectric constant of an oil impregnated paper.

The concept of Garton may be used in accordance with the present invention by having the oil viscosity low and the inter-flake film thickness of oil low. Nevertheless, the resultant cable exhibits an unusually low dielectric constant owing to the imperviousness of the flakes and complete and thorough impregnation. Such a cable can be operated at substantially higher power ratings than a conventional impregnated paper cable.

Advantages of the present invention

In addition to the unexpected advantage of a very low dielectric constant and lower dissipation factor, cables made in accordance with the invention have other advantages, such as smaller diameter and less susceptibility to deterioration in use.

A further advantage is provided by the present invention over the speculated synthetic cables using impervious film of synthetic resins impregnated with oil, as discussed in recent technical literature, which admittedly are not yet ready for commercial production because of work yet required to overcome manufacturing difficulties, problems involving joints and terminals, etc. In contrast, the breakthrough provided by the present invention is immediately available for commercial utility and exploitation. Thus, the present invention provides a dramatic improvement in the efficiencies of oil-impregnated papers by the addition thereto of glass in a controlled manner. Thus, the same paper manufacturing machinery, cable manufacturing machinery and tape wrapping machinery can be used with but minor and controlled modifications of processing procedures. This will not require manufacturers to make new capital investment, nor encounter delays of debugging as are always inherent in new production lines. Thus, a substantial and immediately available advance in the art is provided in accordance with the present invention.

We claim:

1. In a sheet of electrical insulating material,
a fibrous matrix, comprising a kraft-type pulp, glass flakes dispersed in said matrix and oriented in the plane of the sheet with interstitial spaces therebetween,
said interstitial spaces containing oil, and being discretely distributed through the thickness of the sheet,
and said interstitial spaces being of a thickness less than the length of an oil molecule thereby precluding erection of oil molecules perpendicular to the flake faces.

2. In an electrical transmission cable,
a core of electrically conductive material,
an overwrap comprising a plurality of layers of paper including a fibrous matrix with heat-softenable flakes of a thickness in the range from about 0.15 to 10 microns dispersed through the thickness of the sheet and oriented in the plane of the sheet and separated transversely of the thickness of the sheet by interstitial spaces between the flakes,
and thin layers of oil in the interstitial spaces, said layers being of substantially oil molecule diameter thickness.

3. In a sheet electrical insulation material,
a fibrous matrix,
glass flakes of a thickness in a range from about 0.5 to 10 microns and of an area of about $\frac{1}{16}$–$\frac{3}{8}$ inch square dispersed in said matrix and oriented in the plane of the sheet and separated transversely through the thickness of the sheet,
said flakes being separated by interstitial spaces with at least some of the interstitial spaces between the flakes containing at least some fibrous content,
said interstitial spaces additionally containing a dielectric oil,
and said interstitial spaces being of a thickness less than the length of the molecules of said oil, thereby orienting said molecules with their length in the plane of the sheet.

4. In a sheet of electrical insulating material,
a fibrous matrix comprising about 75% of the weight of the sheet,
flakes of E-glass dispersed through said matrix and oriented in the plane of the sheet with interstitial spaces therebetween,
said flakes comprising about 25% of the weight of the sheet and having a thickness in the range from about 0.5 to 10 microns,
said interstitial spaces containing a dielectric oil to the substantial exclusion of gas,
and said interstitial spaces being of a thickness less than the length of the molecules of oil, thereby orienting said molecules with their length in the plane of the sheet.

5. In an electrical transmission cable,
a core of electrically conductive material,
and an overwrap comprising a plurality of layers of paper including a fibrous matrix with flakes of E-glass of a thickness of about 1.5–3 microns dispersed through the thickness of the sheet and oriented in the plane of the sheet and separated transversely of the thickness of the sheet by interstitial, fiber-containing spaces, said flakes having a size in the range of about $\frac{1}{16}$–$\frac{3}{8}$ inch square,
and said interstitial spaces being of substantial oil molecule diameter thickness.

6. In a sheet electrical insulation material,
a matrix comprised of cellulosic fibers of paper-forming length,
flakes of heat-softenable material of a thickness in the range from about 0.5 to 10 microns and of an area of about $\frac{1}{16}$–$\frac{3}{8}$ inch square dispersed in said matrix aind through the thickness of said sheet and oriented in the plane of the sheet,
said interstitial spaces between the flakes containing dielectric oil,
and said interstitial spaces being of a thickness less than the length of the molecules of oil, thereby orienting said molecules with their length in the plane of the sheet.

7. In a sheet electrical insulation material,
a fibrous matrix,
siliceous flakes dispersed in said matrix and oriented in the plane of the sheet with interstitial spaces between the flakes,
said interstitial spaces containing a dielectric oil,
and said interstitial spaces being of a thickness less than the length of the molecules of said oil, thereby orienting said molecules with their length in the plane of the sheet.

8. In a sheet electrical insulation,
a fibrous matrix,
siliceous flakes dispersed in said matrix and oriented in the plane of the sheet with interstitial spaces therebetween,
said interstitial spaces containing a dielectric oil material,
and said interstitial spaces being of a thickness less than the length of the dielectric material molecules, thereby orienting said molecules with their lengths in the plane of the sheet.

References Cited by the Examiner
UNITED STATES PATENTS

| | | | |
|---|---|---|---|
| 3,055,797 | 9/1962 | Bolyard | 162—181 |
| 3,062,912 | 11/1962 | Kelk | 174—120 |
| 3,066,065 | 11/1962 | Koerner et al. | 162—145 |

JOHN F. BURNS, *Primary Examiner.*

JOHN P. WILDMAN, E. JAMES SAX, *Examiners.*